Feb. 21, 1933.  R. DEMKA ET AL  1,898,004

PRESSURE FILLING MACHINE

Filed Dec. 13, 1929  2 Sheets-Sheet 1

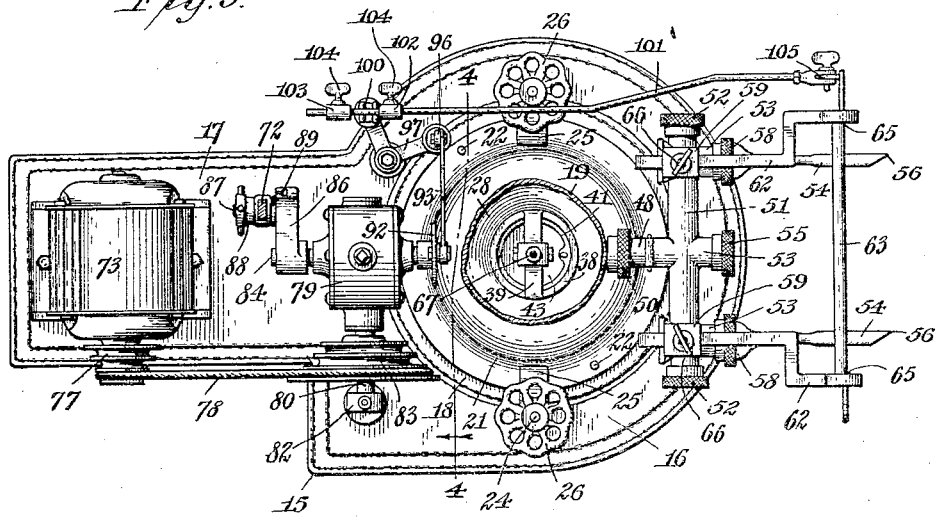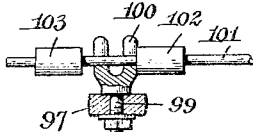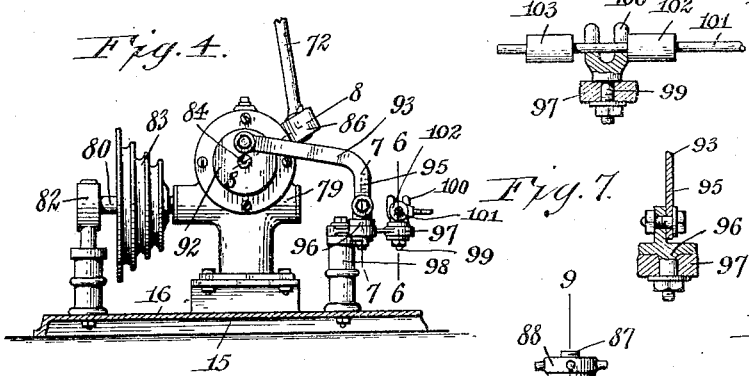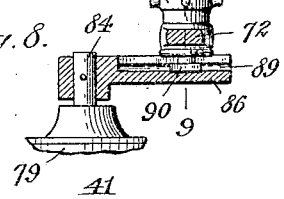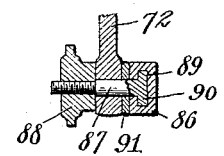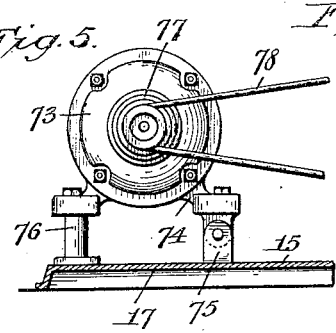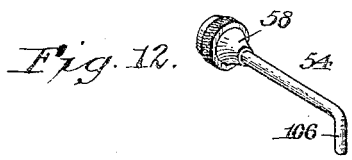

Patented Feb. 21, 1933

1,898,004

UNITED STATES PATENT OFFICE

ROBERT DEMKA AND RAY KNAPP, OF BUFFALO, NEW YORK

PRESSURE FILLING MACHINE

Application filed December 13, 1929. Serial No. 413,835.

Our invention relates to improvements in pressure filling machines, such as used by bakers for filling baked goods with jelly or cream; and while primarily a filling machine, it is also used for depositing jellies, cream, icing, and the like on tarts, cakes, and various other baked goods.

One of the objects of our invention is the provision of a jelly and cream filler, comprising a supply receptacle equipped with new and novel means for ejecting the jelly or cream therefrom; new and novel means for controlling the discharge of the jelly or cream therefrom, and new and novel ejector nozzles for entrance into tarts, cookies, and other baked goods adapted to be filled with jelly or cream.

Another object of our invention is the provision of new and novel drive mechanism for actuating the pressure mechanism, and for automatically removing buns, tarts, and other baked goods being filled, from the ejector nozzles.

Another object is to provide novel means for quickly changing the speed under which the pressure means is operated; and new and novel means for mounting the parts in which jelly or cream is contained and through which it is passed so that such parts can be quickly and readily disassembled and conveniently cleaned.

A further object is the provision of a filling machine of this kind, which is quick-acting and assures a large production and uniform filling, and by means of which every bun or other baked article is filled with approximately the same amount of jelly or cream.

A still further object of our invention is, the production of a machine which is primarily adapted for use as a filler for forcing jellies, cream, and like substances into buns and other baked articles, but which can be used for ornamenting or icing cakes, and also for filling small jars or other containers with mayonnaise or other semi-fluid substances.

With the above and other objects in view, the invention consists in the novel features of construction, and in the arrangement and combination of parts to be hereinafter described and more particularly pointed out in the subjoined claims.

In the drawings:

Fig. 3 is a sectional plan view of the machine, the upper portion of the container being broken away.

Fig. 4 is a transverse section taken on line 4—4, Fig. 3, looking in the direction of the arrow crossing said line.

Fig. 5 is a sectional elevation of the rear end of the machine.

Fig. 6 is an enlarged section taken on line 6—6, Fig. 4.

Fig. 7 is an enlarged section taken on line 7—7, Fig. 4.

Fig. 8 is an enlarged section taken on line 8—8, Fig. 4.

Fig. 9 is a cross section taken on line 9—9, Fig. 8.

Fig. 10 is a sectional perspective view of one-half of the check-valve cage positioned in the outlet portion of the jelly or cream container.

Fig. 11 is a detached perspective view of the check-valve used in connection with the cage shown in Fig. 10.

Fig. 12 is a detached perspective view of a modified form of ejector nozzle.

Figure 1:
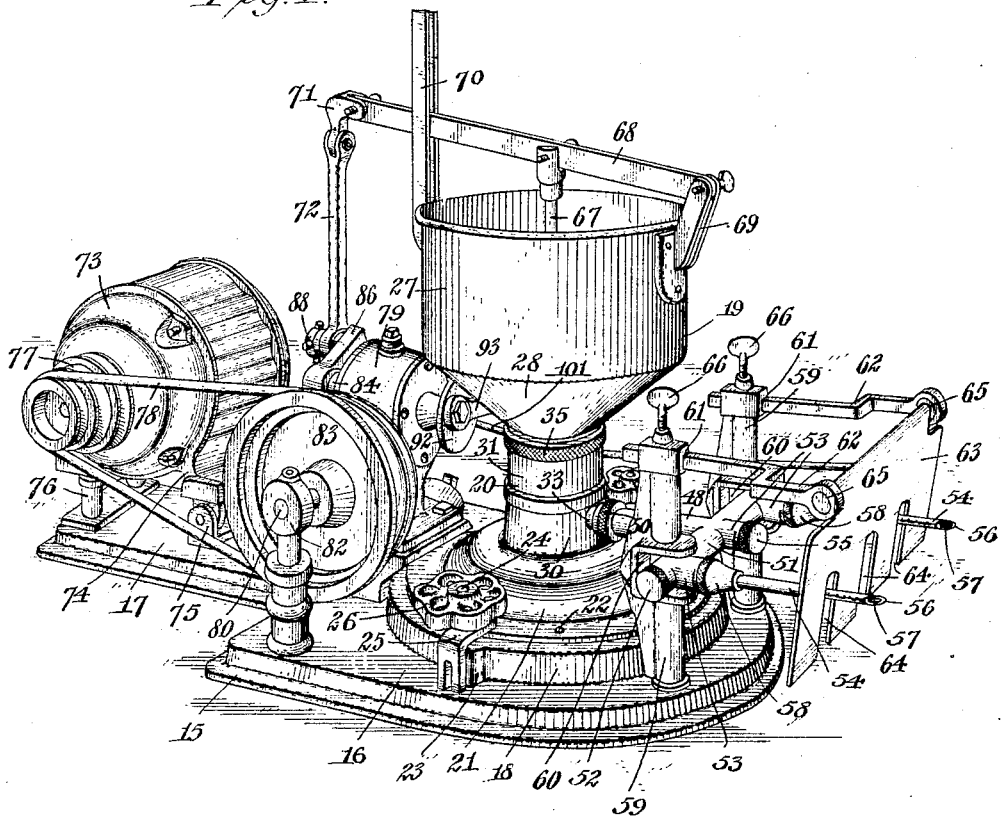
Fig. 1 is a perspective view of our improved jelly or cream-filling machine.

Referring to the drawings in detail, the numeral 15 designates the base of the machine which is in the form of a casting having throughout its major portion a comparatively flat upper surface and provided, at its front end with a comparatively large parti-circular portion 16 and at its rear with a narrowed rectangular portion 17.

Rising from the enlarged parti-circular front portion 16 is a circular table portion 18 to which is secured, in a manner permitting ready attachment thereto and detachment therefrom, the jelly or cream container 19. This jelly or cream container is secured to said circular table by reason of its being mounted upon a conduit pedestal 20, which forms part thereof and has a flaring base 21 seated directly on said circular table, said base 21 having openings therethrough at diametrically opposite points in which are entered positioning studs 22 rising from said circular table.

The circular table is provided at diametrically opposite points with laterally-extending lugs 23 and projecting upwardly from said lugs are screw studs 24. Angular or L-shaped retainer clamps 25 are provided, one leg of each lying against the outer side of a lug 23 and the other leg thereof extending over the top of said circular table and onto the base 21 of the pedestal 20; said retainer clamps having openings therein through which the studs 24 are passed. Applied to said studs are comparatively large wheel or hand nuts 26, which are forced down onto said retainer clamps and securely fasten the jelly or cream container, and more particularly the hollow pedestal thereof, to the base of the machine.

By the use of the openings in the base of the hollow pedestal and the studs 24 on the circular table projecting through said openings, the hollow pedestal and the jelly or cream container will at all times be in the same direction circularly to assure proper connection of operating parts therein with the actuating mechanism, and also proper connection of the outlet of the hollow pedestal with conduit elements associated therewith, as will be hereinafter more fully explained.

The jelly or cream container, which may be referred to as a substance container due to the fact that other jelly-like or semi-fluid substances may be contained therein, is in the form of a receptacle having a cylindrical upper portion 27, a conical or downwardly-tapering lower portion 28 provided at its lower end with a connector flange 29 externally screw-threaded, and the hollow pedestal, which forms the outlet portion of the container and comprises a lower member 30 and an upper tubular member 31, said lower member being provided with a laterally-extending outlet tube 33, and the flaring base 21 previously referred to which provides a substantial support for said hollow pedestal and the substance container proper, mounted thereon.

The lower end of the tubular upper member 31 is screw-threaded into the upper end of the lower member 30 and it is provided at its upper end with an outstanding flange 34 against the under side of which a flange nut 35 engages, said flange nut being threaded onto the externally screw-threaded flange 29 at the lower end of the container proper and making a tight connection of the latter with the upper end of the hollow pedestal. A washer 36 is preferably placed between the flange 29 and the opposing upper face of the hollow pedestal.

Within the tubular portion of the lower member 30 of the hollow pedestal, an inclined substance-directing wall or partition 37 is located, it being inclined downwardly from a high point of said tubular upper portion to the lowest point of the outlet tube 33.

Figure 2:
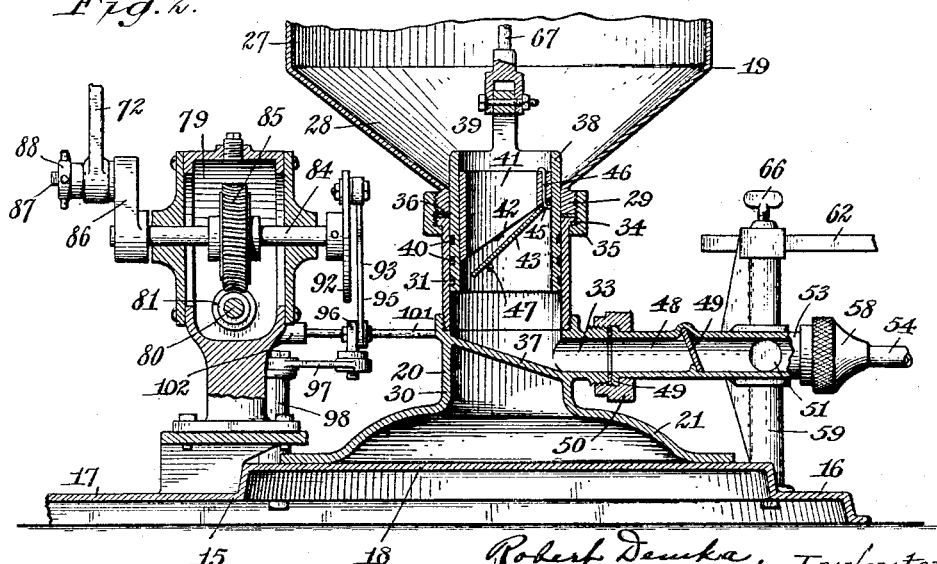
Fig. 2 is a longitudinal vertical section through a portion of the machine.

Arranged for vertical reciprocation in the lower portion of the jelly or cream container, and more particularly in the tubular inner end of the pedestal 20, is a plunger 38 which may be referred to as a valve-containing plunger, for reasons to appear directly. This plunger is in the form of a cylinder or sleeve-like element and it has a bail 39 at its upper end. It is also provided with suitable packing rings 40 to provide a leak-proof fit around the same. Within this plunger is arranged a check-valve, which may be variously constructed and applied, but in preferred form comprises a valve cage in the form of a short sleeve 41, sweated or otherwise held against the inner surface of the body-portion of the plunger; the lower edge of said short sleeve being beveled, as at 42, to serve as an obliquely-disposed valve seat. 43 designates the valve proper, which is in the form of a disk, best shown in Fig. 11, and it is provided at its marginal portion with an opening 44 through which a hook 45 is passed, said hook being formed on the lower end of a wire 46 inserted or cast in the wall of the sleeve 41, or valve body as it may be termed. This wire 46, or valve retainer as it may be termed, extends lengthwise through the short side of the valve-cage or sleeve 41, and when the valve 43 is connected to the hook end thereof, it is free to move away from its valve seat under gravity, or suction. To limit the movement, however, of this valve away from its seat, a stop 47 is provided, preferably in the form of a pin entered in the wall of the plunger. This pin, therefore, serves to limit the opening movement of the valve, as clearly shown in Fig. 2.

Secured to the laterally-extending outlet tube is a discharge tube or conduit 48, which has a check-valve 49 therein. Said discharge tube has an outstanding flange at its inner end over which a flange nut 50 is longitudinally and rotatably movable; this flange nut being adapted for engagement with the outer screw-threaded end of the outlet tube 33. Said discharge tube or conduit 48 forms part of a manifold 51, which extends at right angles to said tube and in opposite directions therefrom. Said manifold is also in the form of a tube having opposite ends capped, as at 52, and it is provided with a plurality of outlet tubes 53, preferably three in number, the intermediate outlet tube being axially alined with the discharge tube 48, the outlet of which latter serves as an inlet for the manifold.

The short outlet tubes 53 of the manifold are externally screw-threaded at their outer ends and are adapted to have selectively applied thereto, ejector or filler nozzles 54, and one or more closures 55 in the form of caps. The ejector or filler nozzles comprise tubes of comparatively small diameter, having their outer ends cut at a bevel to provide sharp points 56 capable of easily penetrating buns or other baked goods to be filled with jelly, cream, or other like substances, and large outlet openings 57. These nozzles have enlarged inner ends or heads 58, which are internally screw-threaded to permit of screw-threadingly applying them to the outlet tubes 53 of the manifold 51, the outer surfaces of these heads being knurled to enable the nozzles to be readily detached from and as easily applied to said outlet tubes without the use of tools. In the drawings we have shown two such nozzles applied to the manifold; and when using two nozzles, they are applied to the two outer outlet tubes of the manifold, the center or intermediate outlet tube being capped, as shown in Figs. 1 and 3. When a single nozzle is to be employed, the two outer outlet tubes 53 are capped and the nozzle applied to the center or intermediate outlet tube. When three nozzles are employed, all outlet tubes 53 are utilized.

The said manifold receives support from standards 59 rising from the base 15 at the front end thereof. These standards may be of any desired construction, but they are provided with forwardly-opening notches 60 which are horizontally alined and in which the ends of the manifold 51 are seated. This arrangement enables the manifold and the discharge tube 48—so considered with reference to its attachment to the jelly or cream container, but serving as an inlet tube for the manifold—to be conveniently attached to the outlet tube 33 of said container; it being understood that said pedestal serves as a portion of the container 19.

When attaching the manifold to the container it is held in proper position by the standards 59 and it is simply necessary to fasten the sleeve nut 50 tightly onto the outlet tube 33 of the container, during which the manifold is drawn rearwardly in the notches without possibility of turning when tightening the sleeve nut 50.

The upper ends of the standards 59 are provided with horizontal slots 61 parallel with the nozzles 54, and in these slots are arranged adjustable arms or brackets 62 which have pivotally attached to their outer or front ends, a combined guard and bun remover in the form of a plate 63 having slots 64 therein, equal in number to the number of nozzles capable of being used in the machine. In preferred form these slots open from the lower edge of the plate upwardly, and said plate has opposite ends at its upper portion pivotally secured to the outer ends of the arms or brackets 62, as at 65, to enable oscillating movement of said combined guard and bun remover toward and from the nozzle manifold 51. Set screws 66 are threaded into the upper ends of the standards 59 and engage the upper edges or faces of the arms or brackets within the slots 61 in said standards.

By adjusting the arms or brackets 62, the nozzles may be arranged to extend any desired degree outwardly beyond the outer face of the plate 63 serving as a guard or bun remover, and when thrusting buns or other baked articles onto the projecting ends of the nozzles, this plate is adjusted so that the nozzles will penetrate the buns to the desired extent, but in no case pass entirely through the same. The machine is also provided with nozzles of different lengths, and all are adapted for use interchangeably.

Pivotally secured to the bail 39 of the plunger 38 is a plunger rod 67, said plunger rod extending upwardly above the upper end of the container and having pivotal connection with an actuating lever 68 at a point between its ends. The front end of said actuating lever is pivotally attached to a bracket 69 extending upwardly and forwardly from the container 19, to which it is riveted or otherwise secured. This lever is also movable within a guide element 70 extending upwardly from the container 19 and secured thereto at a point diametrically opposite the bracket 69, and it extends rearwardly beyond said guide element a distance so that it may be connected to power-actuated mechanism, or be taken hold of for manual actuation. The plunger is, however, particularly designed for power actuation, and pivotally secured to the rear end of said lever 68 is an elbow link 71, one arm of which has pivotal connection with said lever and the other arm pivotal connection with a pitman 72, the pivots of said arms being at right angles to each other.

It is to be noted that the pivots connecting the lever to the bracket 69 and the elbow link 71 to the lever, are detachable pivots; also that the pivot connecting the upper end of the plunger rod 67 with said lever is a detachable pivot; said pivots being in the form of thumb screws which may have unthreaded portions on which ride the movable parts connected thereby.

On the narrowed rear end of the base 15, a motor 73 is mounted, suitable current-conducting wires (not shown) being connected thereto. This motor is provided with radially projecting lugs 74 pivoted to upstanding lugs 75 on the base 15. The pivotal point of this motor is forward of its axis so that the motor can be tilted upwardly and forwardly. The weight of the motor is depended upon to retain it in its normal or lowered position; but, if desired, may be bolted or otherwise retained in position. When in such position, it rests upon a suitable support 76 rising from the base 15. On the shaft of the motor is secured a steppulley 77, each step being grooved so that a drive belt 78 may be selectively applied to said grooves.

Secured to the base 15 forward of the motor, is a reduction gear box or casing 79 through which is transversely passed a rotatable shaft 80 having a worm 81 secured thereon within said box or casing. One end of this shaft extends laterally from the casing and is mounted in a suitable bearing 82, which receives support from the base 15, and on this shaft between said bearing and said reduction gear box or casing is a step pulley 83, the steps of which are in reverse order from the steps of the pulley 77 secured to the motor shaft, each step being provided with a belt groove and said grooves being alined with the grooves of said pulley 77.

The arrangement of the pulleys 77 and 83 is such, therefore, that when the drive belt 78 is arranged in the groove of greatest circumference on the pulley 83, it will be in engagement with the groove of smallest circumference on the pulley 77, and when entered in the groove of greatest circumference on said pulley 77, it will also be entered in the groove of smallest circumference on the pulley 83. The shaft 80 may therefore be driven at its lowest or highest speed under the arrangements stated, or at an intermediate speed by entering the drive belt in the intermediate grooves of the two pulleys. Changing the drive belt to different grooves in the pulleys can be easily effected without stopping the motor; it being only necessary to swing the motor upwardly and forwardly to loosen the belt sufficiently to enable it to be positioned in the desired grooves of the pulleys, and this belt will immediately be tightened for driving action when the motor is allowed to gravitate to normal position.

Extending through the reduction gear box or casing 79 and disposed at right angles to the shaft 80 is a shaft 84 which has secured thereto within said box or casing, a worm wheel 85 which is in mesh with the worm 81 on the shaft 80. The shaft 84 extends out through the end walls or heads at the front and rear of the reduction gear box or casing, said walls or heads providing bearings for said shaft. To the rearwardly-projecting end thereof is secured a crank arm 86 to which is pivotally connected the lower end of the pitman 72. To enable ready disconnection of said pitman from said crank arm, the latter has a stud 87 adjustably arranged therein and extending rearwardly therefrom, said stud being passed through the lower end of the pitman and its screw-threaded end has a hand nut 88 applied thereto. The rotation of the shaft 80, caused by the motor 73, is therefore imparted to the lever 68 through the medium of the reduction gearing, crank arm 86 and pitman 72 above referred to, and the speed at which the plunger 38 within the jelly or cream container is operated is determined by the speed at which the drive belt 80 is driven; this depending on the grooves of the pulleys 77 and 83 in which it is placed.

By making the stud 87 adjustable along the crank arm 86, the range of movement of the plunger 38 in the jelly or cream container may be varied, and to accomplish this, the crank arm is provided with a T-shaped slot or way 89 and the pivot stud 88 has a square head 90 adapted to fit in the head portion of said slot or way, while the adjacent part of the shank of said pivot stud extends through the stem portion of said T-shaped slot or way. We preferably insert a washer 91 between the pitman 72 and the adjacent face of the crank arm 86, as clearly shown in Fig. 9. By moving the stud away from the axis of the crank arm 86, the range of movement of the plunger 38 is increased, and when moving said stud inwardly toward said axis, the range of the movement of the plunger is diminished. Consequently, the amount of jelly, cream, or other similar substance to be forced through the nozzle can be easily controlled by changing the range of movement of the plunger, in the manner described.

The projecting front end of the shaft 84 extending through the reduction gear box or casing 79 has a disk 92 secured thereto, to which is pivotally and eccentrically secured one end of a link or pitman 93, the latter extending laterally from its pivotal point of connection thereto and being thence directed downwardly, as at 95, for pivotal connection to a swivel stud 96 rotatably retained in an opening at the outer end of one arm of a horizontally-movable bell-crank lever 97. This bell-crank lever is pivotally secured to a standard 98 rising from the base 15 and the outer end of the other arm of said bell-crank lever has a swivel stud 99 arranged thereon which is provided with a forked head 100 in which lies an actuating rod 101 adapted for intermittent reciprocating movement. To this rod adjustable collars 102, 103 are secured which lie forward and in rear of said head, said collars having set screws 104 passed therethrough which bear with their inner ends against the actuating rod extending through said collars. The forked head of said swivel stud therefore occupies the space between said collars and the collars are adjusted so that the forked head of said stud, under movement of said crank arm, is caused to move idly within said space during portions of the oscillating movement of said crank-arm, and is adapted to actuate said rod during other portions of its movement in opposite directions.

The front end of said rod is pivotally secured to a lug 105 extending rearwardly from the combined guard and bun remover, which may also be termed a pusher plate, in view of the fact that after buns or the like are forced onto the projecting ends of the nozzles and filled with jelly, cream, or other like substance, this plate pushes the buns from the nozzles; and, if desired, a suitable receptacle may be positioned underneath the projecting ends of the nozzles to receive the buns thus filled. Therefore, during the forward movement of the actuating rod 101, the pusher plate 63 is swung forwardly any desired distance, depending upon the adjustment of the collar 103 on said rod, and is also swung rearwardly to its normal position by the forked head of the swivel stud 99 becoming engaged by the collar 102, as shown in Fig. 3. It will be observed that the pusher plate can be swung rearwardly beyond the position shown in Fig. 1 so that the nozzles project a greater distance beyond said plate, thus enabling the proper filling of elongated baked goods, such as chocolate eclairs, which necessitates their being thrust onto the nozzles a considerable distance; and adjustment of the collars 102 and 103 are therefore made accordingly, causing the forked head of the swivel stud 99 to engage the collars during a longer period of time without changing the range of movement of the bell-crank lever 95. When the projection desired for the nozzles is greater than the limits of compensation of the bell-crank lever and collars, it will be necessary to replace the nozzles with longer nozzles.

It is to be noted that throughout, we have employed pivots and fastening elements which may be loosened and tightened, or completely removed by hand or finger manipulation, so that the parts of the device may be disassembled without the use of tools, and easily cleaned.

The machine is quick-acting so as to assure a large production, and a uniform filling of all buns is also assured under the positive movement of the plunger within the jelly or cream container and the check valve associated therewith. The machine may, furthermore, be speeded up according to the skill that the operator displays in placing the buns or other baked goods on the nozzles. The check-valve provided in the discharge tube 48, serving as the inlet or feed tube of the manifold, assures uniformity of flow of the jelly, cream or other substance and prevents return of the substance passed beyond said check-valve under the suction action of the plunger, thus assuring a complete filling of all nozzles and the conduits leading thereto from the check-valve to the outlets of said nozzles.

While the machine is primarily a filling machine, it is equally adapted for icing or ornamenting baked goods; and when so used, nozzles of the kind shown in Fig. 12 are employed, the nozzles being similar to those used for filling purposes, except that their outer ends are bent downwardly at a right angle, as at 106, and the end thereof is square-cut instead of being cut on a bevel. Cakes to be ornamented may be placed underneath the nozzle or nozzles of the kind shown in Fig. 12, and initials or ornamentations of various kinds applied thereto. Tarts may be filled in a like manner, or cakes iced if desired by ejecting the substance from the container 19 in desired quantities and spreading the accumulated icing over and around the cake. Nozzles of this kind can also be used for filling small jars or like containers with mayonnaise or other semi-fluid substances in predetermined or measured quantities, one or any desired member of cycles of the plunger within the substance container being employed for each jar, depending on the capacity of the latter.

In placing the machine into use, the container 19 is supplied with the desired filling or icing substance, depending on its use, and upon operating the lever 68, either manually or mechanically, the plunger 38 within the container is forced downwardly in the upper portion of the pedestal, with the result that the valve 42 within the plunger closes and any of the substance having passed underneath the valve will be forced along toward and into the outlet tube 33. Several strokes of the plunger will be necessary to force the filling or other substance through the tube 48 and into the ejector nozzles 56, which term would include nozzles of the type shown in Fig. 12, used for icing, ornamenting or other purposes. When the nozzles are completely filled, further operation of the plunger will assure proper filling of the buns or other baked articles thrust over the ends of the nozzles, or measured quantities of the substance being delivered by the nozzles.

In the particular form of our invention disclosed, the plunger is operated under action of the motor 73, which may be placed in operation upon closing a switch, such as is commonly used for establishing an electric current through the motor. The rotation of the motor will operate the shaft 84 at reduced speed, due to the reduction mechanism provided, which includes the reduction gearing within the reduction gear box or casing 79 and the pulleys 77 and 83.

Upon movement of the plunger upwardly, the valve 42 therein will be opened and additional jelly, cream or any other substance in the container will pass down below the plane of said valve, which closes immediately upon the downward movement of the plunger, and the amount of the substance forced from the nozzles is controlled solely by the extent of movement of said plunger, a predetermined amount being ejected from the nozzles into the buns, or otherwise ejected, during each downward movement of the plunger.

The operator placing buns on the nozzles when the pusher plate 63 is in its innermost position, enables him to immediately grasp other buns to be thrust on the nozzles when the buns thrust thereon are filled and removed therefrom by the pusher plate. The capacity of the machine, therefore, depends solely on the speed with which the operator can properly position buns on the nozzles.

When the buns are thrust on the nozzles, the position of the actuating parts are such that the plunger moves downwardly and the pusher plate remains stationary in its rearward position. Immediately the buns are fully filled, the plunger moves upwardly and the bell-crank lever 97 will have brought the forked head of the swivel stud 99 against the rear end of the forward collar 102 on the actuating rod 101, causing said rod to move forwardly and the pusher plate to swing on its pivot so as to remove or push the filled buns from the nozzles. The movement of the parts is so timed that when the pusher plate has reached the end of its forward movement, the bell-crank lever 97 will be ready to reverse its movement, with the result that the forked head of the swivel stud 99 will move idly rearwardly along the actuating rod 101 between the two collars 102, 103 thereon, and then engage the forward end of the collar 103, causing said actuating rod to move rearwardly and swing the pusher plate 63 rearwardly so as to enable additional buns to be positioned on the projecting portions of the ejector nozzles; said bell-crank lever 97 being oscillated by the link or pitman 93, the pivoted inner end of which travels through a circular path by reason of its connection to the disk 92.

It may here be stated that the inclined substance-directing wall is a highly essential feature of our invention, since this wall assures the delivery of coarse portions of the substance, such as raisins, chopped nuts and the like, which would otherwise find lodgment at the bottom of the hollow pedestal and pile up to an extent to clog the outlet leading to the nozzles. This inclined wall assures delivery of such coarse particles under even distribution, within or on the baked goods, the same as maintained in the substance in the container.

Having thus described our invention, what we claim is:

1. In a machine of the character described, a container having a tubular lower portion provided with an outlet, and a plunger comprising a hollow-member open at its upper and lower ends and having a short sleeve secured therein provided with a beveled lower end, a disk valve adapted to close against said sleeve, and means within said plunger beneath said valve to limit the opening movement thereof.

2. In a machine of the character described, a container having a tubular lower portion provided with an outlet, and a plunger comprising a sleeve-like member open at its upper and lower ends and a valve-cage positioned within said sleeve-like member and having its lower end obliquely disposed; a wire passed lengthwise through the short side of said cage and having a hook at its lower end, a disk valve having an opening through which said hook is passed and being adapted to close against the obliquely-disposed lower end of said cage, and a pin extending through said plunger underneath the lower end of said cage and adapted to limit the opening movement of said disk valve.

3. A machine of the character described, comprising a container, a manifold connected to said container and receiving a filling substance therefrom, and a plurality of ejector nozzles secured to said manifold and adapted to have baked articles thrust thereon to be filled, means for forcing the filling substance from said container through said manifold, and movable means synchronously timed according to the filling operation of said baked articles to remove said articles from said nozzles when filled.

4. A machine of the character described, comprising a base, a container removably secured to said base, a motor on said base, an ejector nozzle in conduit connection with the interior of said container and adapted to receive a filling substance from said container, pressure mechanism for forcing a predetermined quantity of the filling substance through said nozzles into baked articles thrust thereon, gear-reduction mechanism mounted on said base and operatively connected with said motor, connection between said gear-reduction mechanism and said pressure mechanism for actuating the latter, pusher means for removing the filled baked articles from said nozzle, and means between said gear-reduction mechanism and said pusher means for operating the latter.

5. A machine of the character described, comprising a base, a container removably secured on said base and adapted to contain a filling substance, standards rising from said base and having notches therein, a manifold having opposite end portions disposed in said notches and being in conduit connection with said container, ejector nozzles removably secured to said manifold, means within said container for forcing a predetermined quantity of the filling material therefrom outwardly through said manifold, brackets adjustable in said standards, a pusher plate pivotally secured at its upper end to said brackets and having openings therein through which said ejector nozzles extend, and motor-operated mechanism for actuating said pressure means and for swinging said pusher plate.

6. A machine of the character described, comprising a base, a container removably attached to said base and adapted to contain a substance to be delivered therefrom in predetermined quantities, standards rising from said base and having notches therein, a manifold having opposite end portions disposed in said notches and being in conduit connection with said container, ejector nozzles removably secured to said manifold, means within said container for forcing the substance contained therein therefrom outwardly through said manifold, brackets adjustable in said standards, a pusher plate pivotally secured at its upper end to said brackets and having openings therein through which said ejector nozzles extend, and motor-actuated means for continuously operating said pressure means and for intermittently operating said pusher plate.

7. A machine of the character described, comprising a base, a container rising from said base, standards disposed forward of said container and spaced apart, said standards having notches therein, a manifold extending from one standard to the other and being mounted within the notches thereof, said manifold being removably secured to said container and having a series of outlet tubes thereon, a cap closing one of said outlet tubes, ejector nozzles removably secured to the other outlet tubes of said manifold, brackets adjustable in the upper end of said standards and extending forwardly therefrom, a pusher plate pivotally secured at its upper end to the other end of said standards and having said nozzles projecting forwardly therethrough, means for forcing a filling medium from said container through said manifold and nozzles, and co-operating means for swinging said pusher plate to remove articles from said nozzles after being filled.

8. A machine of the character described, comprising a container, a plurality of ejector nozzles in conduit connection with said container and adapted to have baked articles thrust onto the outer ends thereof, pressure means for forcing a filling substance from said container outwardly through said nozzles, pusher means for removing the baked articles when filled from said nozzles, a motor, a shaft operated by said motor at a reduced speed, and connection between said shaft and said pressure means and also between said shaft and said pusher means for actuating both.

9. In a machine of the character described, a container for a filling substance having an enlarged upper portion and a tubular lower portion to which said enlarged upper portion is removably secured, said tubular portion having an enlarged base provided with an outlet and a substance-directing wall therein inclined towards the lowest point of said outlet, a pressure plunger in said tubular lower portion, and an ejector nozzle removably secured to said outlet.

10. In a machine of the character described, a filling container, an ejector nozzle in conduit connection with said filling container and adapted to have baked articles thrust thereon to be filled with the filling in said container, a plunger for ejecting the filling from said container through said nozzle and into the baked articles thrust on said nozzle, a pusher element movable along said nozzle, a rotatable shaft, operative connection between said shaft and said plunger, a rod connected to said pusher element, a swivel stud having a forked head through which said rod is passed, a bell-crank lever on which said swivel stud is mounted, adjustable collars on said rod at opposite sides of the forked head of said swivel stud, and connection between said bell-crank lever and said shaft for rocking said lever and causing intermittent reciprocating movement of said rod.

11. In a machine of the character described, the combination with a stationary ejector nozzle, a pivoted element having an opening through which said nozzle extends, and means for swinging said pivoted element to move the same along said nozzle.

12. A machine of the character described, comprising an ejector nozzle onto which a baked article is to be placed and through which a filling substance is directed into said baked article, a plate having an opening through which said nozzle extends and being adjustable along the length of said nozzle, and means for moving said plate in the direction of the length of said nozzle to eject filled baked articles therefrom.

13. In a machine of the character described, a stationary ejector nozzle, a pivoted plate having an opening through which said nozzle extends, a rod pivotally connected to said plate to swing the same in the direction of the length of said nozzle, adjustable collars on said rod, a swivel stud having a forked head straddling said rod between said collars, a lever in which said swivel stud is arranged, and means for actuating said lever.

In testimony whereof, we affix our signatures.

ROBERT DEMKA.
RAY KNAPP.